Feb. 22, 1949.  H. COHEN  2,462,721
CLAMP
Filed March 22, 1947
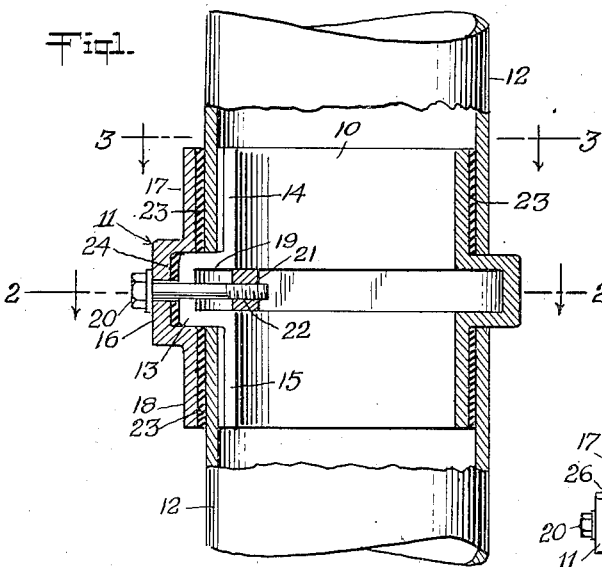
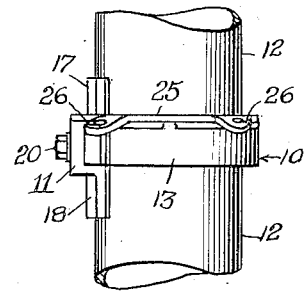
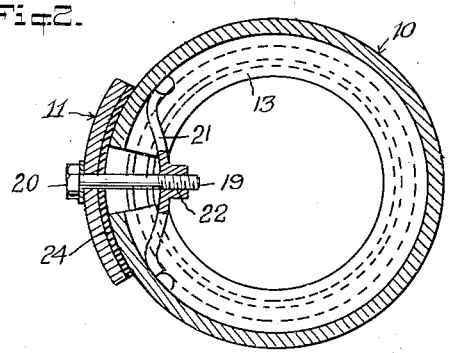
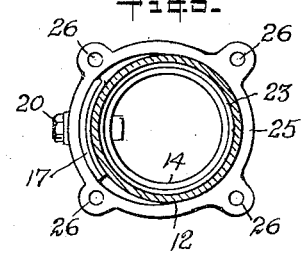
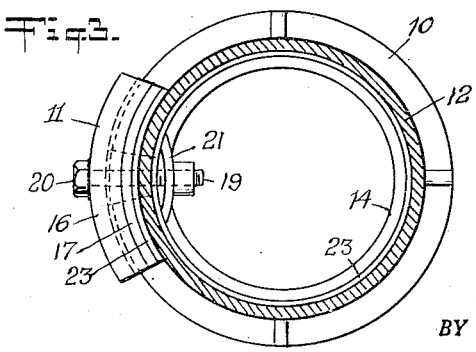
INVENTOR.
Harold Cohen
BY
Munn, Liddy & Glaccum
Attorneys Patented Feb. 22, 1949

2,462,721

UNITED STATES PATENT OFFICE 2,462,721

CLAMP

Harold Cohen, Elizabeth, N. J.

Application March 22, 1947, Serial No. 736,468

5 Claims. (Cl. 285—197)

This invention relates to a clamp for connecting or coupling separate parts, and may be used advantageously for connecting or coupling sections of a mast or the legs of a tower and analagous structures.

An object of the present invention is the provision of a clamp whose parts constitute a unit ready for use by a simple operation for the stated purposes.

A further object of the invention is the provision of a clamp of the indicated character which may be used for coupling sections of gradually different cross sectional sizes to produce a mast of tapered construction.

A further object is to provide a clamp of the indicated character for coupling the sections of a mast enabling the use of means for guying the mast yet permitting turning of the mast as may be desired when using the mast for radio transmission and reception purposes.

With the foregoing, other objects of the invention will appear when the following specification is read in conjunction with the accompanying drawing, in which—

Fig. 1 is a sectional view showing the clamp of the present invention connecting or coupling two structural members, only portions of which are shown.

Fig. 2 is a sectional view taken on the line 2—2 of Fig. 1.

Fig. 3 is a sectional view taken on the line 3—3 of Fig. 1.

Fig. 4 is a side view showing the adaptation of the clamp for using a guy collar.

Fig. 5 is a plan view of the parts shown in Fig. 4.

Referring now more particularly to the several views of the drawing, it will be apparent that the present clamp comprises two cooperative members 10 and 11, respectively, and means engaged with the members for expanding the member 10 as may be required for effecting the clamping action on the separate sections 12 of a mast for instance. These sections are tubular and round in cross section.

The members 10 and 11 are constructed to jointly embrace the adjacent ends of two sections 12 when they are arranged in longitudinal alinement as shown. The members 10 and 11 are segmental or arcuate and overlap each other forming a ring like structure. The member 10 is the main part and made of metal by virtue of which the member 10 may be expanded or contracted. The member 11 also of metal may be flexed or bowed to cooperate with the member 10 to effect the clamping pressure.

The member 10 has a body 13 U shape in longitudinal section and said body 13 has flanges 14 and 15 integral and coextensive therewith.

The member 11 has a body 16 U shape in longitudinal section complemental to the body 13 of the member 10, and said body 16 has flanges 17 and 18 to oppose the flanges 14 and 15, respectively, where they overlap the same in use.

The means for exerting the clamping pressure on the members 10 and 11 comprises a threaded bolt 19 having a head 20 and a bowed auxiliary clamping member 21 having a threaded hole 22 extending through a boss or the like on the member 21. The bolt 19 extends loosely through the member 11 radially thereof. The member 11 is disposed on the outside of the member 10. The member 21 is arranged inside of the member 10 and the opposite ends of the member 21 bear on the end portions of the member 10 at the split. The head 20 bears on a washer which bears on the member 11. The bolt 19 is threaded in the hole 22. The construction and arrangement of the various parts are such that they are held together as a unit ready for use.

One section 12 has one end inserted between the flanges 14 and 17 and the other section 12 has one end inserted between the remaining flanges 15 and 18. By turning the bolt 19 one way the member 21 is drawn toward the member 11. This causes the member 21 to exert pressure on the adjacent ends of the member 10, thereby causing the members 10 and 11 to clamp the sections 12 connecting or coupling them in longitudinal alinement. The member 10 is of a size that its flanges 14 and 15 fit loosely in the sections 12. By actuating the bolt 19 the member 10 is expanded, and this need only be slightly to effect the necessary clamping action of the members 10 and 11 against the sections 12.

It is to be observed that the ends of the sections 12 abut the body 13 of the member 10 endwise. This helps to make a rigid and stable coupling of the sections 12.

If desired, gaskets or the like 23 may be interposed between the flanges 14, 15, 17 and 18 and the sections 12 to weatherproof the structure at these points. The flanges are considered as contacting the inner and outer surfaces of the sections 12. A gasket 24 is arranged between bodies 13 and 16.

The U shape bodies of the members 10 and 11 as applied to the sections 12 enable the employment of a collar 25 loosely surrounding the flanges 14 and 17 and resting on the shoulder provided by said bodies. The collar 25 has means 26 for connecting guy lines thereto for holding the sections 12 upright. It is understood the required number of sections 12 may be used to form a mast of any desired height with a clamp between the relatively adjacent lower and upper sections throughout. Any suitable number of collars 25 may be used and though they will be anchored to the ground by guy lines, the mast may be turned as may be desired when the mast is used to support a radio aerial or antenna.

As shown in Fig. 1, the flange 14 is in axial alinement with the flange 15 of the clamping member 10. Also, the flange 17 is in axial alinement with the flange 18 of the clamping member 11. If desired, the flanges of each of said clamping members may be offset with respect to each other so that tubular sections of different cross sectional sizes may be used to produce a mast or pole of tapered construction.

I claim:

1. A clamp for tubular sections of a mast or analogous structure comprising two cooperative segmental clamping members constructed to jointly embrace the adjacent ends of two of said sections when the latter are arranged in longitudinal alinement, said members overlapping each other and having opposed flanges contacting the inner and outer surfaces of the sections, and securing means engaging said members causing them to clamp the sections in their longitudinal alinement.

2. A clamp as set forth in claim 1, wherein said members have substantially U shape bodies lengthwise with respect to said sections.

3. A clamp as set forth in claim 2, wherein the ends of the sections abut the body of one of the clamping members endwise.

4. A clamp as set forth in claim 1, wherein said securing means comprises a bolt having a head on one end, said bolt extending between the ends of said sections, and an auxiliary clamping member through which the bolt extends, said head bearing on the auxiliary clamping member and the ends of the latter bearing on one of the first mentioned clamping members.

5. A clamp for tubular sections of a mast or analogous structure, comprising two separable segmental clamping members constructed to jointly embrace the adjacent ends of two of said sections when the latter are arranged in end to end relation, said members overlapping each other and having opposed flanges disposed at the inner and outer surfaces of said sections, weatherproofing material interposed between the flanges and said sections, and securing means engaging said members causing them to clamp all of the parts arranged as aforesaid.

HAROLD COHEN.

REFERENCES CITED

The following references are of record in the file of this patent:

UNITED STATES PATENTS

| Number | Name | Date |
| --- | --- | --- |
| 89,373 | Abbott | Apr. 27, 1869 |
| 645,885 | Bonnell et al. | Mar. 20, 1900 |
| 1,025,759 | McCluskey | May 7, 1912 |
| 1,197,858 | Redmon | Sept. 12, 1916 |
| 1,821,182 | Hoppes | Sept. 1, 1931 |
| 2,326,941 | Heitner | Aug. 17, 1943 |